United States Patent [19]
Kawawada et al.

[11] Patent Number: 6,040,648
[45] Date of Patent: Mar. 21, 2000

[54] SPINDLE MOTOR AND ROTATOR DEVICE

[75] Inventors: Naoki Kawawada; Hiroaki Namiki; Isamu Takehara; Tadao Iwaki; Takashi Ishida; Shinichi Hayashizaki; Hirotada Shimaguchi; Katsushige Konno, all of Chiba, Japan

[73] Assignee: Seiko Instruments Inc., Japan

[21] Appl. No.: 09/235,671

[22] Filed: Jan. 22, 1999

[51] Int. Cl.$^7$ .............................. H02K 5/16; F16C 32/06
[52] U.S. Cl. ............................. 310/90; 310/91; 384/107; 384/112
[58] Field of Search .............. 310/90, 90.5, 91, 310/67 R; 384/100, 107, 114, 112, 121, 123, 124, 132; 360/98.07, 99.04, 99.08; 277/399, 400

[56] References Cited

U.S. PATENT DOCUMENTS

| | | | |
|---|---|---|---|
| 4,795,275 | 1/1989 | Titcomb et al. | 384/107 |
| 5,487,608 | 1/1996 | Leuthold et al. | 384/113 |
| 5,516,212 | 5/1996 | Titcomb | 384/107 |
| 5,524,985 | 6/1996 | Dunfield | 384/107 |
| 5,548,437 | 8/1996 | Yoshimoto et al. | 359/200 |
| 5,634,724 | 6/1997 | Zang et al. | 384/107 |
| 5,770,906 | 6/1998 | Hazelton et al. | 310/90 |
| 5,847,479 | 12/1998 | Wang et al. | 310/90 |

*Primary Examiner*—Nestor Ramirez
*Assistant Examiner*—Nguyen N Tran
*Attorney, Agent, or Firm*—Adams & Wilks

[57] ABSTRACT

A spindle motor having a simplified construction with reduced axial and radial deflection while avoiding the half whirl phenomenon includes a motor frame, a rotating shaft supporting a rotor, a stator and stator coil, a permanent magnet opposing the stator, and a liquid dynamic pressure bearing. Magnetic centers of the permanent magnet and stator coil, in the axial direction of the rotating shaft, are substantially matched. The liquid dynamic pressure bearing comprises opposing surfaces of the rotating shaft and the housing. The rotating shaft has a disk-shaped thrust bearing portion disposed in a first portion of a cylindrical hole of the housing, and a radial bearing portion disposed in a second portion of the cylindrical hole. Lubricating oil fills a space between the cylindrical hole and the thrust bearing portion and radial bearing portion, and a presser ring is pressed and fixed into a third portion of the cylindrical hole to seal the bearing. A boss portion of the rotor is fixed to a rotor supporting portion of the rotating shaft so that an inner peripheral surface of the boss portion mates with an outer peripheral surface of the rotor supporting portion. The rotating shaft has three axially-spaced portions, with the disk-shaped thrust bearing portion formed between and having a larger diameter than the other portions. A stage is provided between the thrust bearing portion and the rotor supporting portion to serve as a seat for installation of the boss portion.

17 Claims, 2 Drawing Sheets

SPINDLE MOTOR AND ROTATOR DEVICE

BACKGROUND OF THE INVENTION

The present invention relates to a spindle motor and a rotator device in which a rotor is fixed at a rotating shaft included in a liquid dynamic pressure bearing and a stator is fixed at a housing included in the liquid dynamic pressure bearing.

FIG. 4 is a sectional view showing the spindle motor disclosed in U.S. Pat. No. 5,487,608. In the spindle motor, a rotating shaft 1 included in a liquid dynamic pressure bearing is worked in one body with a rotor 2. A ring-shaped thrust bearing member 4 is put into a small diameter hollow portion 3a of a two stage hollow portion formed at lower face of a housing 3 in the housing included in dynamic pressure bearing portion through rotating shaft 1, and is fitted by force to the rotating shaft 1. An oil receiver is formed between the small diameter hollow portion 3a and the thrust bearing member 4. Forcing a presser ring 5 into a large diameter hollow portion 3b, lubricant oil is filled in the circumferential space of the rotating shaft 1. The thrust dynamic pressure bearing is formed at both sides of the thrust bearing member 4, and a radial dynamic pressure bearing is formed at circumferential face of the upper rotating shaft 1 rather than the thrust bearing. At high speed rotation, radial dynamic pressure generating grooves are formed so that net flow of lubricating oil orients in the direction of the thrust bearing, and thrust dynamic pressure generating grooves are formed so that net flow of lubricating oil orients in the radial direction. Therefore, lubricating oil does not leak when the motor rotates at high speed. A capillary seal comprising an oil receiver 6 is provided at the place where lubricant oil is exposed to air from the outside so that lubricating oil does not leak when the motor stops. The radial bearing and the thrust bearing are connected through communicating holes 9a, 9b, and 9c so as to allow the smooth flow of lubricant liquid.

However, in the above-mentioned spindle motor it is hard to form the radial dynamic generating groove because the rotor 2 and the rotating shaft are formed in one body. By forming the thrust bearing member 4 at the lower portion of the rotating shaft 1, both faces of the thrust bearing member 4 form the thrust dynamic pressure bearing, and upper side circumference face of the shaft rather than the thrust bearing member 4 of the rotating shaft 1 forms the radial dynamic pressure bearing. As connecting the radial bearing and the thrust bearing through communicating holes 9a, 9b, and 9c causes a failure in keeping highly accurate rotating balance, incline of the rotor toward the stator becomes large at starting and stopping of rotation. Therefore, contact occurs easily between members comprising the bearing, and there is a possibility of shortening production life and cause of half whirl phenomenon. The spindle motor can not be used for an HDD (Hard Disc Drive) in which deflection should be extremely small, for example, less than ±5 µm at 7 to 8 mm from center of rotation of the rotor in axial direction, and less than ±2.5 µm in the radial direction. It is hard to form the radial dynamic pressure generating groove at the rotating shaft 1 formed with the rotor 2 in one body, and it causes high cost. Moreover, connecting the radial bearing with the thrust bearing through the communicating holes 9a, 9b, and 9c causes high cost.

In another prior art method, there is a method of forming separately the rotor and the rotating shaft accurately and fitting and fixing them taking about 1 to 200 µm space between them using adhesive and connecting shaft. By the method, the center of rotation of the rotating shaft and the rotor deflect, and their centers of rotation of are not parallel. Therefore, deflections of axial direction and radial direction in the above-mentioned spindle motor for HDD and the like can not be smaller than the required minimum value. Adhesive flowing in unnecessary areas causes more trouble.

Still in another prior art method, after forming separately the rotor and the rotating shaft with some degree of accuracy and assembling the spindle motor by pressing together lightly the rotor and the rotating shaft, working for increasing deflection is carried out in order to make deflection of axial direction of the rotor less than the designed value driving the rotor. By the method, it is possible that chip comes inside of the motor.

The present invention is intended to solve the above-mentioned problems, and an object thereof is to provide a spindle motor and a rotator device in which deflections of axial direction and radial direction are extremely small while the half whirl phenomenon does not occur and it is easy to produce.

SUMMARY OF THE INVENTION

The present invention provides the following spindle motor. The spindle motor comprises a rotor fixed to a rotating shaft included in a liquid dynamic pressure bearing and a stator fixed at a housing included in the liquid dynamic pressure bearing, wherein said liquid dynamic pressure bearing includes said rotating shaft having a disk-shaped thrust bearing portion at an intermediate portion thereof in one body and having a radial bearing portion and a supporting shaft portion at both ends thereof, the thrust bearing portion and the radial bearing portion of said rotating shaft are disposed in a cylindrical hole having large diameter and small diameter formed in said housing, and surrounding space is filled with lubricant oil and is sealed with a presser ring fixed at the housing, said rotor is positioned in a pressing direction by a boss portion formed at a center of the rotor and is pressed and fixed into said supporting shaft portion of the rotating shaft and the face of the boss portion is touched end portion of stage portion of said rotating shaft, and wherein magnetic center of rotating shaft direction of magnet formed in the rotor and magnetic center of rotating shaft direction of a stator coil are substantially matched.

The present invention provides a spindle motor wherein said liquid dynamic pressure bearing has an oil receiver at the bearing of at least one of said thrust bearing and said radial bearing.

The present invention provides a spindle motor wherein radio h/d of shaft direction fitting length h of said supporting shaft portion of the rotating shaft and said boss portion of the rotor to fitting diameter d is within about 0.3 to 2.0.

The present invention provides a spindle motor wherein said liquid dynamic pressure bearing has a capillary seal including an oil receiver enlarging toward air outside at end portion exposed in air outside of space of bearing of said supporting shaft portion.

The present invention provides a rotator device using the spindle motor for a driving source.

DETAILED DESCRIPTION OF THE PREFERRED EMBODIMENTS

Figure 1:
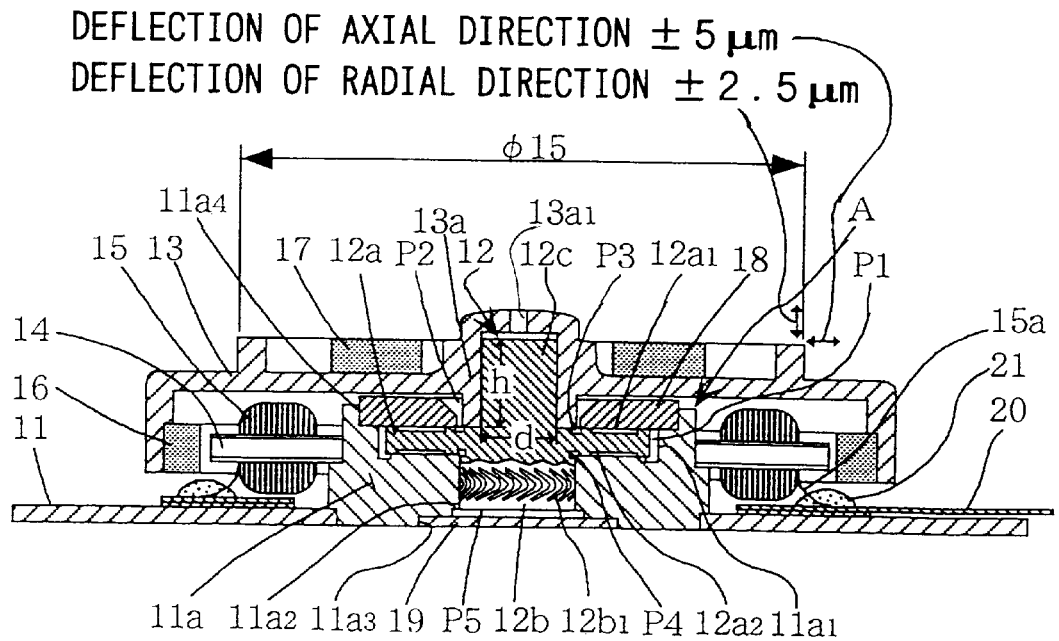
FIG. 1 is an enlarged center longitudinal sectional view showing a spindle motor according to a first embodiment of the present invention.

Referring FIG. 1, a first embodiment of a spindle motor according to the present invention will be described. The spindle motor M has a motor frame 11 fixing a housing 11a included in a liquid dynamic pressure bearing A, a rotor 13 fixed at a rotating shaft 12 included in the liquid dynamic pressure bearing A, a stator 14 pressed and fixed at the outer circumference of the housing 11a, a motor coil 15 formed at the stator 14, a permanent magnet 16, and a magnet 17 for chucking media fixed at the upper face of the rotor 13.

The liquid dynamic pressure bearing A comprises the rotating shaft 12, the housing 11, and a presser ring 18. The rotating shaft 12 has a disk-shaped thrust bearing portion 12a at an intermediate portion thereof in one body, and both ends thereof are a radial bearing portion 12b and a supporting shaft 12c. The housing 11a is formed at the motor frame 11 in one body and its shape has three stage cylindrical holes. The thrust bearing portion 12a of the rotating shaft 12 is put in a intermediate diameter cylindrical hole 11a1, and the radial bearing portion 12b of the rotating shaft 12 is put in a small cylindrical hole 11a2. A circular bottom cap 19 is pressed into and fixed at a circular hollow portion 11a3 at the lower side of the small cylindrical hole 11a2, the presser ring 18 is pressed into and fixed at a large diameter cylindrical hole 11a4 after filling lubricant oil at in the space of circumferential the rotating shaft 12, and the thrust bearing portion 12a of the rotating shaft 12 is thereby sealed. Thrust dynamic pressure generating grooves 12a1 and 12a2 are engraved on both faces of the thrust bearing portion 12a, and the thrust dynamic pressure bearing comprises the thrust bearing portion 12a, the housing 11a, and the presser ring 18. Radial dynamic pressure generating groove 12b1 is engraved on circumferential face of the radial bearing portion 12b, and the radial dynamic pressure bearing comprises the radial bearing portion 12b, and the housing 11a. The rotor 13 has a boss portion 13a at center thereof, and the boss portion 13a is pressed and fixed at the supporting shaft portion 12c of the rotating shaft 12 so that end face of the boss portion 13a is in contact with the thrust bearing portion 12a of said rotating shaft 12. Magnetic center of said rotating shaft direction of the magnet 16 for the rotor 13 and magnetic center of rotating shaft direction of the stator coil 15 are substantially matched.

A terminal 15a of coil wire of the stator coil 15 is connected to pole of flexible printed wire 20 formed at a ring-shaped hollow portion (not shown) of the motor frame 11 with solder 21. The boss portion 13a center at the rotor 13 is closed at the upper end thereof and has a spherical surface shape so that a center hole of a removable media disk is smoothly inserted in the upper end of the boss portion 13a. A bleeder hole 13a1 is formed at closed upper end portion of the boss portion 13a formed at center of the rotor 13 and can bleed air inside of the boss portion 13a at the time of fitting the boss portion 13a and the supporting shaft portion 12c.

In this case, it is desirable that the ratio h/d of fitting length h of shaft direction of the supporting shaft portion 12c of the rotating shaft 12 and the boss portion 13a of the rotor 13 to the fitting diameter d is within the range of about 0.3 to 2.0. At measurement of a trial product in which ratio h/d is 0.3, it was seen that deflections are extremely decreased as follows. Deflection in the axial direction was less than ±5 $\mu$m at 7.5 mm from the center of rotation in the rotor and deflection of radial direction was less than ±2.5 $\mu$m.

When the ratio of h/d is more than 2.0, it is hard to keep working accuracy of fitting portion precisely. Moreover, force for fitting the supporting shaft portion 12c of the rotating shaft 12 and the boss portion 13a of said rotor 13 becomes too large, and applies to the rotating shaft 12 and the rotor 13 so as to cause bad assembling accuracy. Therefore, it is not desirable that the ratio h/d is more than 2.0.

In oil receiver P2 (space), space enlarges toward air outside and contacts the air outside. As oil receivers P1 to P5 are small in space, lubricating oil filling by capillary phenomenon acts by surface tension when the spindle motor stops. When lubricant oil filling in the lower portion of the oil receivers P1 to P5 moves to the upper portion of the oil receivers, lubricant oil inside of the bearing becomes subject to negative pressure. Because of this, surface tension acting on lubricant oil filling in the lower portion of the oil receivers P1 to P5 and negative pressure generated when the lubricant oil filling in the lower portion of the oil receivers P1 to P5 moves to wide space of upper portion prevent the lubricant oil filling in the lower portion of the oil receivers P1 to P5 from leaking from the oil receiver P5. Therefore, the oil receiver P2 functions as a capillary seal.

As the oil receiver P2 has a shape enlarging to contact air outside, lubricant oil does not leak from the oil receiver P2 even if temperature and pressure of the surroundings greatly increase.

Figure 4:
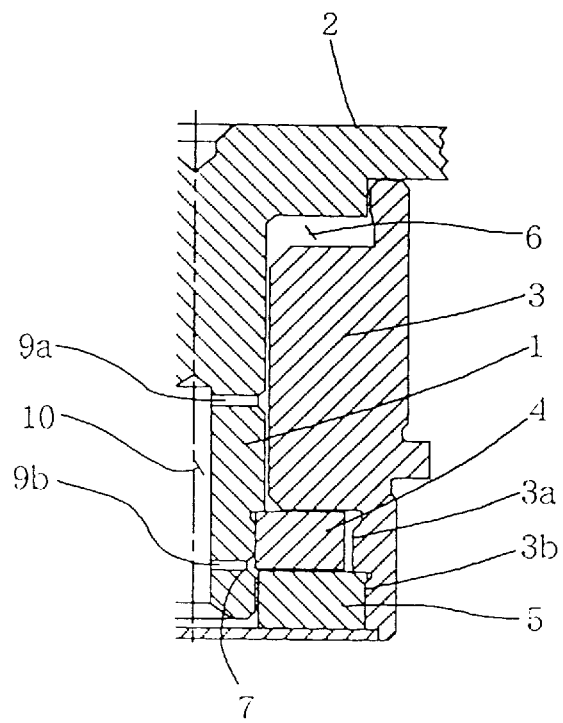
FIG. 4 is an enlarged center longitudinal sectional view showing the main portion of the spindle motor according to U.S. Pat. No. 5,487,608.

Thus, oil receivers P4 and P5 are formed for the radial dynamic pressure bearing, and oil shortage and bubbles do not appear at oil suction side of the radial dynamic pressure generating grooves at high speed rotation so as to generate high radial dynamic pressure. Therefore, stable high speed rotation can be obtained even for large load. As oil receivers P1, P3, and P4 are formed for the thrust bearing portion, oil shortage and bubbles do not appear at oil suction side of the thrust dynamic pressure generating grooves at high speed rotation so as to generate thrust dynamic pressure similarly as liquid dynamic pressure bearing in the prior device shown in FIG. 4 forming oil hole for plural pressure balance.

Figure 2:
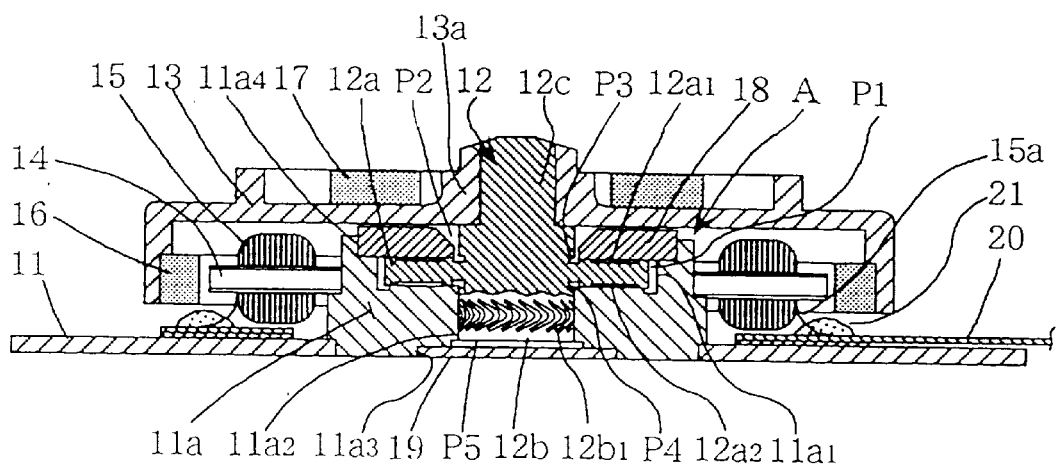
FIG. 2 is an enlarged center longitudinal sectional view showing a spindle motor according to a second embodiment of the present invention.

FIG. 2 shows a spindle motor of a second embodiment of the present invention.

The spindle motor M differs from the spindle motor of the above-mentioned first embodiment as follows. A supporting shaft portion 12c is formed like a shaft with a stage, a boss portion 13a formed at center of a rotor 13 so as to touch an end face of the stage portion is pressed and fixed to small diameter portion of the supporting shaft portion 12c of a rotating shaft, the end face of the boss portion 13a substantially matches an end face of a presser ring 18 of the rotating shaft 12, and a circumference groove P3 is formed engraving at border corner of a thrust bearing portion 12a and the supporting shaft portion 12c so as to function as an oil receiver. The boss portion 13a at the center of the rotor 13 is formed like cylinder shape, the supporting shaft portion 12c protrudes over the boss portion 13a, and the upper end face of the supporting shaft portion 12c and the boss portion 13a has a conical shape so that a center hole of movable media disk is smoothly inserted in upper end portion of the boss portion 13a.

As the other elements are the same as elements of FIG. 1, the description is omitted applying the same symbols to the same elements.

Figure 3:
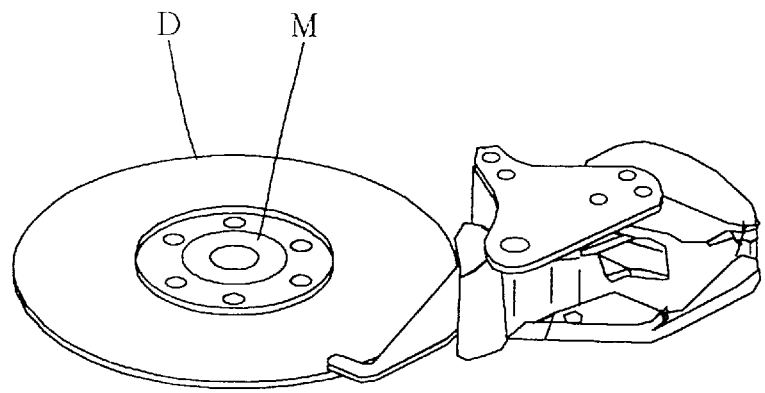
FIG. 3 is an outline perspective view showing a rotator device using the spindle motor of FIG. 1 for rotating driving source.

FIG. 3 shows a rotator device adopting the spindle motor of FIG. 1 for a rotating driving source. The rotator device is a removable hard disk drive device, and a rotated disk D of magnetic disk or optical disk media is attached at a rotor of the spindle motor M. The rotator device has function, operation, and advantages of the spindle motor of the present invention.

The spindle motor of the present invention has a construction in which the thrust bearing portion 12a of the rotating shaft 12 and the radial bearing portion 12b are inserted in a cylindrical hole having three stages formed in the housing 11a, and surrounded space is filled with lubricant oil and sealed with the presser ring 18 so as to form a necessarily and sufficiently long radial dynamic pressure bearing. The boss portion 13a is pressed and fixed into the supporting shaft portion 12c so that the end portion of the boss portion 13a formed at the rotor 13 contacts the end face of the rotating shaft 12. As pressing dimension is constant, pressing process matching magnetic center of the rotating shaft 12 direction of the magnet 16 forming the rotor 13 with magnetic center of rotating shaft direction of the motor coil becomes simple and accurate. Therefore, deflections in the axial direction and radial direction are decreased greatly without occurence of the half whirl phenomenon, and additional process of removing deflection is not needed after assembling.

In the result of trial production of 50 spindle motors shown in FIG. 1, at outer edge portion of upper face of the rotor (at radius of 7.5 mm), deflections of axial direction of all trial products are less than ±5 μm, and deflections of radial direction are less than 2.5 μm so as to contribute to improvement of reliability of HDD and the like using for spindle motor of HDD.

As the rotating shaft 12 is separated from the rotor 13 and has the thrust bearing portion 12a in one body, the thrust dynamic pressure generating groove and the radial dynamic pressure generating groove between which dynamic pressure concerns mutually closely by relative position are formed so as to have precious relative position. Therefore, producing the dynamic pressure generating groove at the rotating shaft 12 is easy.

As the liquid dynamic pressure bearing having a particular construction forming the rotating shaft 12 of cross shape in section and putting the rotating shaft in the housing 11a having two cylindrical holes, large and small, sealing with the presser ring 18 in the spindle motor of the present invention, incline of the rotor to the stator at the spindle motor stops. Therefore, friction by contact is hard to occur between components of the bearing and life of product does not become short.

The spindle motor of the present invention has liquid dynamic pressure bearing having a particular construction forming the rotating shaft 12 of cross shape in section and putting the rotating shaft in the housing 11a having two cylindrical holes, large and small, sealing with the presser ring 18 in the spindle motor of the present invention. Adding this construction, the spindle motor has advantages that the construction is simple, it is easy to produce, it is capable of being miniaturized; instability of rotation and sliding with contact are decreased, weights of the stator coil and core are lightened, and exciting current is decreased. As an oil receiver is formed at least one of the thrust bearing and the radial bearing in the liquid dynamic pressure bearing, oil shortage and bubbles of lubricant oil do not appear at oil suction side of dynamic pressure generating groove in a part of the thrust bearing and the radial bearing at high speed rotation adding to the above-mentioned advantages so that smooth and stable high speed rotation is realized for high load. Moreover, as the liquid dynamic pressure bearing has the capillary seal comprising the oil receiver P2 enlarging toward air outside at the end portion exposed to air outside of space of the bearing of the supporting shaft portion 12c, the spindle motor is formed by machining without any affecting to forming of dynamic pressure generating grooves of the thrust bearing portion and the radial bearing portion so as to decrease dynamic pressure adding to the above-mentioned advantages.

Moreover, the rotator device of the present invention has function, operation, and advantages of the spindle motor of the present invention.

What is claimed is:

1. A spindle motor comprising: a housing; a rotating shaft mounted to the housing to undergo rotational movement, the rotating shaft having a rotor supporting portion, a thrust bearing portion, and a radial bearing portion; a rotor fixed to the rotor supporting portion of the rotating shaft to undergo rotational movement therewith; a magnet mounted to the rotor; a stator having a stator coil fixed to the housing to oppose the magnet and to generate a magnetic force in cooperation with the magnet to cause the rotor and the rotating shaft to undergo rotation; a liquid dynamic pressure bearing comprising opposing surfaces of the housing and the rotating shaft; the thrust bearing portion of the rotating shaft comprising a disk-shaped member formed at an intermediate portion of the rotating shaft between the rotor supporting portion and the radial bearing portion, and having a larger diameter than said other portions of the rotating shaft, the radial bearing portion and the rotor supporting portion being formed at opposite axial ends of the rotating shaft; a cylindrical hole formed in the housing in which the thrust bearing portion and the radial bearing portion of the rotating shaft are supported to undergo rotational movement, the cylindrical hole having a first portion with a first diameter in which the radial bearing portion is disposed and a second portion with a second diameter larger than the first diameter in which the thrust bearing portion is disposed; lubricant oil filled in a portion of the cylindrical hole surrounding the thrust bearing portion and the radial bearing portion; and a presser ring fixed to the housing to cover the cylindrical hole around the rotating shaft to seal the lubricant oil in the housing; wherein the rotor has a boss portion formed at a center thereof, the boss portion having an inner peripheral surface which contacts and is fixed to the rotor supporting portion of the rotating shaft, and wherein a magnetic center of the magnet in the axial direction of the rotating shaft and a magnetic center in the same direction of the stator coil are substantially matched.

2. A spindle motor according to claim 1; wherein the inner peripheral surfaces of the boss portion of the rotor and the rotor supporting portion of the rotating shaft have equal heights (h), and a ratio (h/d) of the height of said surfaces to the diameter (d) of the rotor supporting portion of the rotating shaft is within the range of about 0.3 to 2.0.

3. A spindle motor according to claim 1; wherein the liquid dynamic pressure bearing further comprises an oil receiver disposed at one or more of the thrust bearing portion and the radial bearing portion.

4. A spindle motor according to claim 1; wherein the liquid dynamic pressure bearing further comprises a capillary seal comprising an oil receiving space formed by the liquid dynamic pressure bearing and in communication with air outside the bearing, the oil receiving space expanding upon rotation of the rotor and the rotating shaft.

5. A rotator device using the spindle motor according to any one of claims 1 to 4; for a driving source.

6. A spindle motor according to claim 1; further comprising a bottom cap fixed to the housing adjacent the radial bearing portion of the rotating shaft.

7. A spindle motor comprising: a housing; a rotating shaft disposed in the housing and mounted to undergo rotational movement, the rotating shaft having a rotor supporting portion, a thrust bearing portion, and a radial bearing portion, the rotor supporting portion and the radial bearing portion being formed at opposite axial ends of the rotating shaft, and the thrust bearing portion comprising a disc-shaped member formed between the supporting portion and the radial bearing portion and having a larger diameter than said other portions of the rotating shaft; a rotor mounted to the supporting portion of the rotating shaft to undergo rotational movement therewith, the rotor having a central hole therethrough through which the rotor is mounted to the supporting portion of the rotating shaft; a magnet mounted to the rotor; a stator mounted to the housing and having a coil for generating a magnetic force in cooperation with the magnet to control rotation of the rotor and the rotating shaft; a cylindrical opening formed in the housing in which the rotating shaft is disposed, the cylindrical hole having a first portion having a first diameter in which the radial bearing portion is disposed and a second portion having a second diameter larger than the first diameter in which the thrust bearing portion is disposed; and a presser ring fixed to the housing to seal the housing.

8. A spindle motor according to claim 7; wherein the disk-shaped member is formed at an intermediate portion of the rotating shaft and the rotor supporting portion.

9. A spindle motor according to claim 7; wherein the inner peripheral surfaces of the boss portion of the rotor and the rotor supporting portion of the rotating shaft have equal heights (h), and a ratio (h/d) of the height of said surfaces to the diameter (d) of the rotor supporting portion of the rotating shaft is within the range of approximately 0.3 to 2.0.

10. A spindle motor according to claim 7; wherein opposing surfaces of the rotating shaft, the cylindrical hole and the presser ring comprise a liquid dynamic pressure bearing.

11. A spindle motor according to claim 10; further comprising a lubricant oil disposed in the cylindrical hole.

12. A spindle motor according to claim 11; wherein the liquid dynamic pressure bearing further comprises a capillary seal comprising an oil receiving space formed by the liquid dynamic pressure bearing and in communication with air outside the bearing, the oil receiving space expanding upon rotation of the rotor and the rotating shaft.

13. A motor comprising: a housing; a stator coil mounted to the housing; a rotor having opposing upper and lower surfaces; a rotor magnet for generating a rotational force in cooperation with the stator coil, the rotor magnet being attached to one of the upper and lower surfaces of the rotor so as to oppose the stator; a liquid dynamic pressure bearing rotatably supporting the rotor with respect to the supporting body, the liquid dynamic pressure bearing comprising a cylindrical hole formed in the housing for rotatably supporting a rotating shaft having a radial bearing portion and a thrust bearing portion, the cylindrical hole having a first portion having a first diameter in which the radial bearing portion is disposed and a second portion having a second diameter larger than the first diameter in which the thrust bearing portion is disposed, and a presser ring fixed to the housing to seal the housing around the rotating shaft; and a rotor supporting portion formed at an opposite axial end of the shaft from that of the radial bearing for supporting the rotor.

14. A spindle motor according to claim 13; wherein the thrust bearing portion comprises a disk-shaped member formed at an intermediate portion of the rotating shaft between the rotor supporting portion and the radial bearing portion, and having a larger diameter than said other portions of the rotating shaft.

15. A spindle motor according to claim 13; wherein the wherein the inner peripheral surfaces of the boss portion of the rotor and the rotor supporting portion of the rotating shaft have equal heights (h), and a ratio (h/d) of the height of said surfaces to the diameter (d) of the rotor supporting portion of the rotating shaft is within the range of approximately 0.3 to 2.0.

16. A spindle motor according to claim 13; further comprising a lubricant oil disposed in the cylindrical hole.

17. A spindle motor according to claim 16; wherein the liquid dynamic pressure bearing further comprises a capillary seal comprising an oil receiving space formed by the liquid dynamic pressure bearing and in communication with air outside the bearing, the oil receiving space expanding upon rotation of the rotor and the rotating shaft.

* * * * *